United States Patent [19]

Finger

[11] Patent Number: 4,552,162

[45] Date of Patent: Nov. 12, 1985

[54] ELECTRIC COMBINATION CLEANER

[75] Inventor: John F. Finger, Beresford, S. Dak.

[73] Assignee: Sioux Steam Cleaner Corporation, Beresford, S. Dak.

[21] Appl. No.: 498,457

[22] Filed: May 26, 1983

[51] Int. Cl.[4] .............................................. F16K 49/00

[52] U.S. Cl. .................................................. 134/57 R

[58] Field of Search .............. 134/57 R, 102; 239/137

[56] References Cited

U.S. PATENT DOCUMENTS

| | | | |
|---|---|---|---|
| 2,295,228 | 9/1942 | Malsbary et al. . | |
| 2,345,614 | 4/1944 | Malsbary et al. . | |
| 2,627,015 | 1/1953 | Hackman . | |
| 2,755,130 | 7/1956 | Arant . | |
| 2,861,838 | 11/1958 | Wyatt et al. . | |
| 3,814,321 | 5/1974 | Mulholland et al. . | |
| 4,217,924 | 8/1980 | Finger ............................ | 134/102 X |

OTHER PUBLICATIONS

Sioux Corporation brochure.

Alkota Manufacturing, Inc. brochure.

*Primary Examiner*—Stephen Marcus

*Assistant Examiner*—Renee S. Kidorf

*Attorney, Agent, or Firm*—Merchant, Gould, Smith, Edell, Welter & Schmidt

[57] ABSTRACT

The specification discloses an improved pressure cleaning system (10) which is adapted to facilitate complete purging of air and thus priming of the system in minimal time, and which incorporates all mechanical or electrical components constructed and arranged so as to be suitable for use in hazardous areas. The cleaning system (10) includes a float entry tank (20) connected via a U-shaped conduit (38) to a pump (42) located at substantially the same level as the tank. An electrical heater tank (88) is connected to the pump (42) and is located beneath the pump. A flow sensor (28) on the inlet to the float water tank (20) and temperature sensor (132) on the heater tank (88) are provided for sensing conditions which could lead to overheating and thus premature burnout of the heating elements in the heater tank. The controls are responsive to the flow sensor (28) and temperature sensor (132).

4 Claims, 5 Drawing Figures

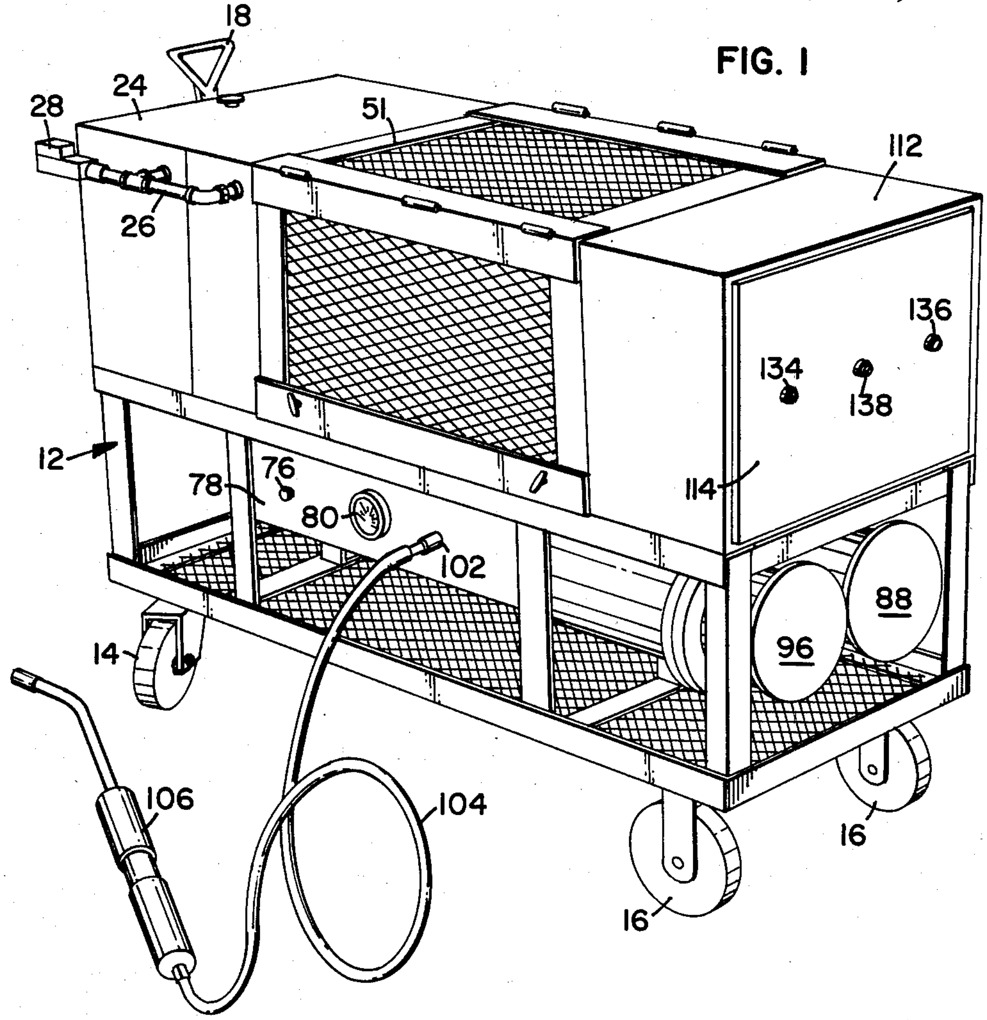
FIG. 1
FIG. 3
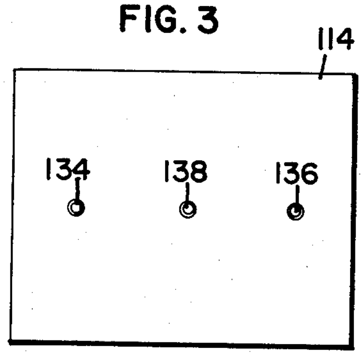
FIG. 4
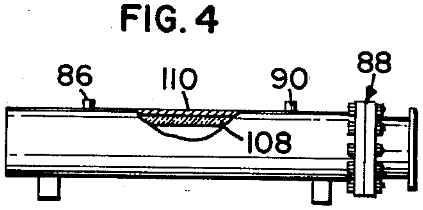

ELECTRIC COMBINATION CLEANER

TECHNICAL FIELD OF THE INVENTION

The present invention relates generally to pressure cleaning systems, and more particularly to a combination steamer and washer which is adapted for use under hazardous conditions and which incorporates improved flow control features to assure quick priming of the system and to minimize the possibility of premature burnout of the heater elements.

Background Art

Pressurized steam cleaners and washers are utilized in a variety of situations for cleaning purposes. Such systems generally include a pair of tanks, one of which is for liquid solution of cleanser or detergent and the other of which is for water. These tanks are connected to the inlet of a pump, usually through a mixer or aspirator which mixes the liquids in the desired ratios into a suitable mixture, for discharge under pressure through the nozzle of a wand. Equipment of this type is controlled primarily by switching the pump on and then manipulating the wand as necessary to spray the object being cleaned.

Traditionally, such cleaning systems have utilized burners to heat the mixture, however, such systems are best suited for applications where proper ventilation is no problem. Such is the case, for example, in car washes where the cleaning system is housed in a room and the cars or trucks to be cleaned are brought to the facility. There are many applications, however, where the cleaning system must be brought to the facility, or area being cleaned, and the cleaning must be accomplished under conditions which are not compatible with the operation of burners which give off flames, fumes and smoke. This is particularly critical in high hazard areas such as grain elevators and the like, where a spark or open flame could trigger an explosion. For this reason, cleaning systems have been developed heretofore which utilize electrical heating elements. Such cleaners have been available from Sioux Steam Cleaner Corporation, the assignee hereof, and U.S. Pat. No. 2,861,838 to Wyatt and U.S. Pat. No. 2,627,015 to Hackman are representative of the prior art in this area.

Although the electric cleaning systems of the prior art have functioned reasonably well, under some conditions they have not been without certain difficulties. For example, purging of the air and priming of the system upon start-up are relatively time consuming in the systems of the prior art. This in turn results in delays and erratic operation before the system is at full pressure. This can in turn also cause flow discontinuities within the system which can result in overheating and damage. In the case of cleaning systems with electrical heaters, it is especially important that the heating elements always be substantially filled or covered during operation to avoid uneven heating and thus premature burnout of the resistance elements. Such cleaning systems are usually operated on an intermittent basis, and it will be appreciated that the problem of maintaining adequate priming throughout the system, both in the tanks or coils, has been a chronic problem.

A need has thus developed for a new and improved combination cleaner of all electrical design which incorporates explosion proof features and which is adapted to effect complete and rapid priming of the system upon start-up while being responsive to flow discontinuities which could damage the electrical heater elements.

SUMMARY OF INVENTION

The present invention comprömises an improved combination cleaner which overcomes the foregoing and other difficulties associated with the prior art. In accordance with the invention, there is provided a combination steam cleaner and washer which incorporates insulated electrical heater tanks and other features, and is otherwise adapted so as to be substantially explosion proof and safe for operation in hazardous areas. The system comprises a float entry tank which is connected via U-shaped lines to at least one pump located at substantially the same level as the tank. The pump in turn is connected to an electrical heater tank which is located beneath the level of the float entry tank and pumps. If desired, a plurality of pumps can be connected in parallel for discharge through a common line. The heater tank is of the electrical resistance type which is preferably surrounded by insulation and an outer shell which remains at substantially ambient temperature to form a cool wall construction. If desired, a plurality of heater tanks can be coupled together in series. The outlet of the heater tank is connected via a U-shaped line to an outlet, to which the discharge hose and nozzle are connected. The system is enclosed in framework which is supported for mobility. A box on the enclosure houses the controls, which are responsive to a flow-sensor valve on the inlet to the float tank, and a temperature sensor on the inlet of the electrical heater tank. This provides control redundancy whereby power to the electrical heater tank is shut off in the event of either flow interruption to the float entry tank, or an undue temperature rise in the heater tanks. Except for the discharge hose and nozzle, all of the pumps, controls and other components of the cleaning system are enclosed to minimize danger of ignition.

BRIEF DESCRIPTION OF DRAWINGS

A better understanding of the invention can be had by reference to the following Detailed Description in conjunction with the accompanying Drawings, wherein:

FIG. 1 is a perspective view of the combination cleaner of the invention;

FIG. 3 is an diagram of the control panel of the combination cleaner herein;

FIG. 4 is a side view, partially cutaway to show the insulating jacket on the heater tank.

DETAILED DESCRIPTION

Figure 2:
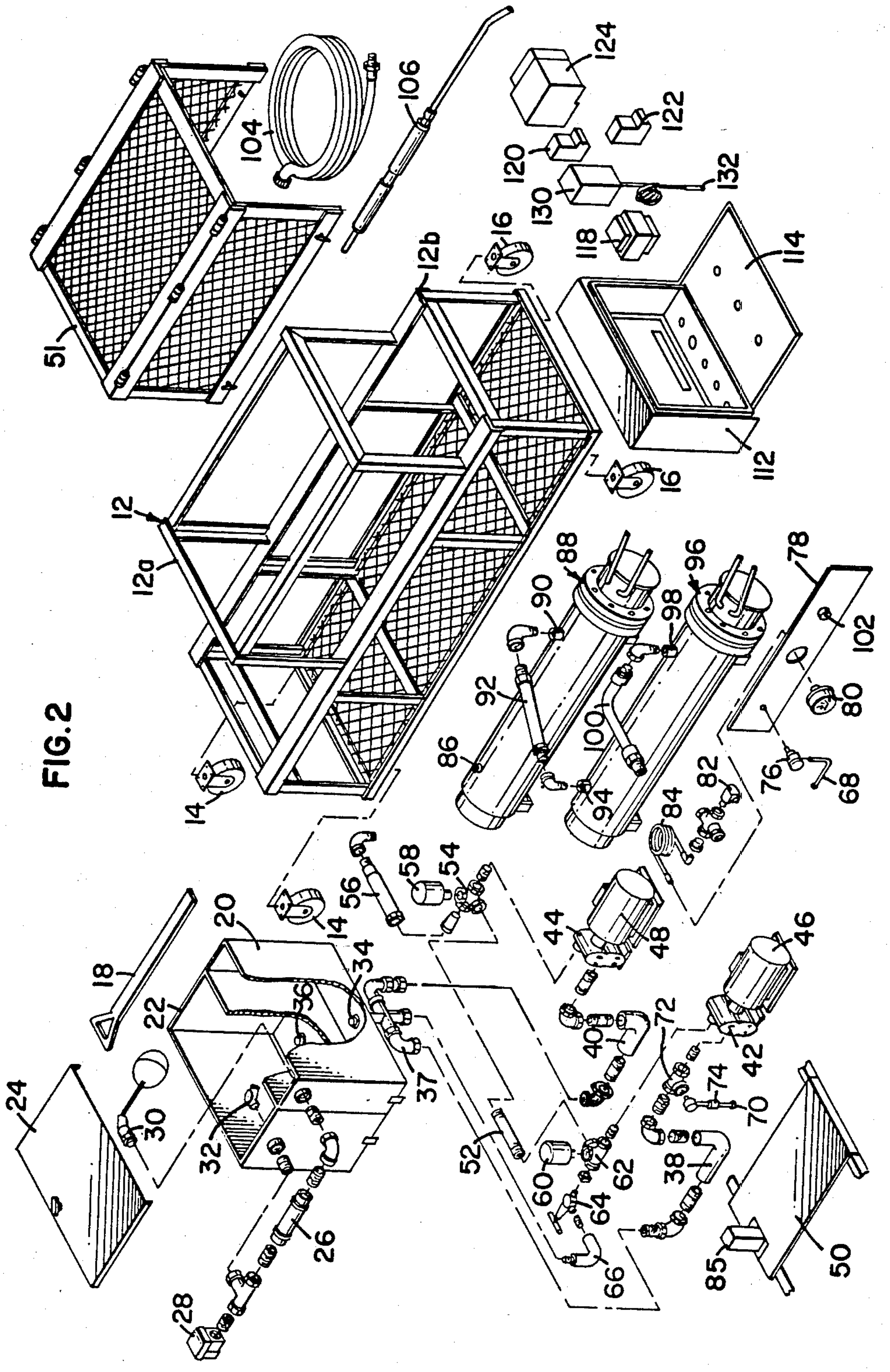
FIG. 2 is an exploded view of the components and assemblies comprising the invention, with portions cut away for clarity.

Referring now to the Drawings, wherein like reference numerals designate corresponding elements throughout the views, and particularly referring to FIG. 1, there is shown the combination cleaning system 10 of the invention. The system 10 is referred to as a combination cleaner and washer because it can be utilized either as a steam cleaner, or as a high pressure hot or cold washer. As will be explained more fully hereinafter, the cleaning system 10 is of substantially all electric design suitable for use under hazardous conditions, and incorporates features for improved flow control to avoid overheating and possible burnout to the electrical heater elements of the heater tanks.

The cleaning system 10 includes a mobile frame 12 supported on wheels 14 and 16 for movement to and from the cleaning site. Frame 12 includes an upper portion 12*a* and a lower portion 12*b*. Wheels 14 are preferably caster type wheels, while wheels 16 are non-casting for better controllability while maneuvering. A pivotal handle 18 is provided at one end of frame 12 to facilitate maneuvering of the cleaning system 10.

Referring now to FIG. 2 in conjunction with FIG. 1, the cleaning system 10 includes a pair of tanks 20 and 22 which are mounted at one end of frame 12 and covered by a hinged lid 24. A supply line 26 is connected to tanks 20 and 22. The supply line 26 is adapted for connection to a water faucet or other source of liquid. Water enters the supply line through a flow sensor 28 before passing through a float valve 30 into the water tank 20. The float valve 30 controls the water level in tank 20. The supply line 26 is also connected via a manual valve 32 to the solution tank 22. The solution tank 22 is at least partially filled with water to which the desired amount of detergent or other cleaning compound is added before operating the cleaning system 10 to form a detergent solution which is then mixed with the water from the float valve tank 20 and discharged under pressure. One or more outlets 34, as shown are provided in the bottom of the float tank 20, while one outlet 36 is provided in the bottom of the solution tank 22. The outlets 34 and 36 are preferably covered with sediment strainers as shown to prevent clogging of the system.

The outlets 34 of the float water tank 20 are connected via a manifold 37 through U-tubes 38 and 40 to the inlets of pumps 42 and 44, respectively. The pumps 42 and 44 compromise positive displacement pumps, with pump 42 being primary and pump 44 being secondary. The pumps 42 and 44 are driven by motors 46 and 48 respectively. The pumps 42 and 44 and motors 46 and 48 are mounted on a base plate 50 which is located within the upper portion 12*a* of the frame 12 on substantially the same level as the lower ends of tanks 20 and 22. The upper frame portion 12*a* is preferably covered with a removable shroud 51 to enclose the pumps 42 and 44 and associated components. It will thus be appreciated that the outlets 34 of the float water tank 20 are connected by U-tubes 38 and 40 to the inlets of pumps 42 and 44 located at substantially the same level as the bottom of the tank. This arrangement provides a flooded inlet to the pumps 42 and 44, and compromises an important feature of the invention.

The outlet of the primary pump 42 is connected by tube 52 to a T-connection 54 interconnecting the outlet of the second pump 44 with discharge tube 56. It will thus be appreciated that the outlets of pumps 42 and 44 are connected in parallel to a common discharge line 56. An accumulator 58 is connected to the T-connection 54 for damping transient pressure surges and spikes in the system. Only one accumulator connected to the common discharge line 56 is required, however. If desired, another accumulator 60 and T-connection 62 can be provided on the outlet of the primary pump 42 as well. An unloader 64 is preferably connected to the tube 52 as shown, or to the common discharge line 56, for additional protection against pressure spikes in the system, such as those that would occur upon clogging of the nozzle with a piece of sediment. The unloader 64 functions much like a pressure relief valve in that it diverts a portion of the output of pumps 42 and 44 back into the float water tank 20 through line 66 which is connected to one of the outlets of manifold 37.

Although the cleaning system 10 is illustrated and described as having two pumps 42 and 44, it will be understood that the invention can be utilized with only one pump. The use of a second pump doubles the flow capacity and thus increases the pressure. With two pumps, it is possible to produce steam, high pressure hot wash, or high pressure cold wash, as desired, as will be explained more fully below.

With respect to the solution tank 22, the outlet thereof is connected to an inlet line 68 leading to a solution valve 70 connected to a T-connection 72 between the U-tube 38 and the inlet of primary pump 42. A check valve 74 is preferably provided between the solution valve 70 and the T-connection 72 to prevent back-flow of water into the solution tank 22. The solution valve 70 is controlled by means of a knob 76 located on control panels 78 to adjust the proportionate amount of detergent solution from tank 22 to be mixed into water from the tank 20. The detergent solution from tank 22 is thus added to the water from tank 20 immediately before entering the primary pump 42 which then pumps the solution through the remainder of the cleaning system 10, either with or without the additional pumping action of the secondary pump 44. The panel 78 also includes a pressure gauge 80 which is connected via pressure relief valve 82 and line 84 to the common discharge line 56 to monitor operating pressure of the cleaning system 10.

If desired, an optional chemical pump 85 can be connected in line 68 to assist delivery of solution from tank 22.

Referring still to FIG. 2 in conjunction with FIG. 1, the common outlet line 56 from pumps 42 and 44 is connected to the inlet 86 of an electrical heater tank 88 located beneath pumps 42 and 44 within the lower portion 12*b* of frame 12. The outlet 90 of the first heater tank 88 is connected by a tube 92 to the inlet 94 of a second heater tank 96 located beside the first heater tank. The heater tanks 88 and 96 are thus connected in series. The outlet 98 of the second heater tank is connected by tube 100 to a discharge outlet 102 on the gauge panel 78. A hose 104 and spray wand 106 are connected to the discharge outlet for spraying the object to be cleaned through the nozzle of the wand.

Although the cleaning system 10 is illustrated and described with two heater tanks 88 and 96 connected in series, it will be understood that one heater tank can be utilized or more than two heater tanks can be utilized as desired. The use of additional heater tanks provides additional heating capability for larger flow capacities, such as when multiple pumps are utilized. The heater tanks 88 and 96 are of somewhat conventional construction in that each tank comprises a vessel with an imersion type electrical vessel. In the preferred embodiment, as is best seen in FIG. 4, each heater tank is provided with an insulating jacket comprising a surrounding layer of insulation 108 and an outer metal jacket 110 to provide a cool wall construction so that the outside surfaces of the heater tanks remain at substantially ambient temperature. This is shown only for heater tank 88, however, it will be understood that each heater tank has such an insulating jacket. This comprises an important feature of the invention.

Figure 5:
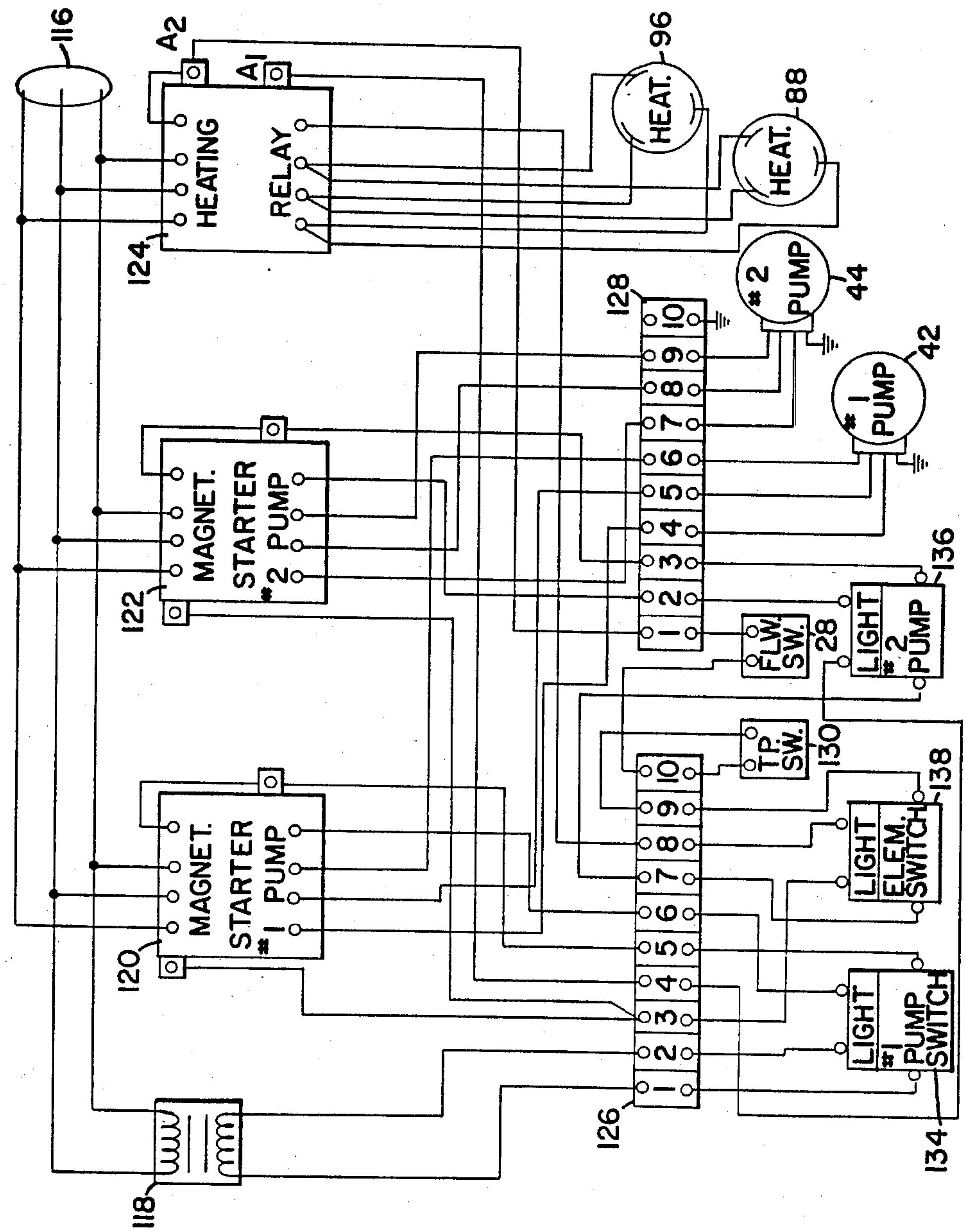
FIG. 5 is an electrical schematic of the controls of the combination cleaner of the invention.

Referring now FIG. 5 in conjunction with FIGS. 2 and 3, the control circuitry for the cleaning system 10 is contained in a control box 112 located on the opposite end of frame 12 from the tanks 20 and 22. Box 112 includes a hinged front panel 114 which carries certain controls and which opens for access to components therein. The cleaning system 10 includes three phase, 460 volts, 60 herz power supply lines 116 which are connected to one side of a transformer 118, and the inputs of a magnetic starter 120 for the primary pump 42, a magnetic starter 122 for the secondary pump 44, and a contactor or relay 124 for the heater tanks 88 and 96. Transformer 118 steps down the supply voltage to a level compatible with the other electrical components of system 10.

The other side of transformer 118 and the outlets of magnetic starters 120 and 122 and relay 124 are connected to terminal strips 126 and 128 as shown. It will be apparent that the heating relay 124 is responsive to the flow sensor 28 as well as to a temperature limit switch 130. The temperature limit switch in turn is connected to temperature sensor, or probe 132 mounted in a well (not shown) in the head of each heater tank 88 and 96. For purposes of clarity, a single probe 132 has been shown in FIG. 2 in separated, exploded fashion, although it will be understood that a temperature probe is provided for each heater tank 88 and 96. It will thus be appreciated that the heater tanks 88 and 96 are responsive to both inlet flow conditions and temperature conditions within the heater tanks, such that electrical current to the resistance heater elements is interrupted in the event of inadequate water supply or undue temperature rise within the heater tanks, either of which could lead to overheating and thus damage and premature burnout.

As is best seen in FIG. 3, the front of the hinged panel 114 includes a switch 134 for the primary pump 42, a switch 136 for the secondary pump 44, and a switch 138 for the electrical resistance heater elements within the heater tanks 88 and 96. The switches 134, 136 and 138 are preferably of the sealed, lighted pushbutton type which serve not only as controls but also as indicators. Switches of this type are commercially available from various sources, including Cutler Hammer. If the optional chemical pump 85 is utilized, an additional switch (not shown) would be included on the panel 114.

The cleaning system 10 operates as follows. Assume that the float valve tank 20 is filled with water and that the tank 22 is filled with a solution of detergent and water. The switch 134 is actuated to energize the system and turn on the primary pump 42. This will provide a high pressure, "cold" wash at ambient temperature with the desired amount of detergent solution in the mixture as adjusted with knob 76. If a hot wash or steam is desired, then pushbutton switch 138 must also be actuated to energize via relay 124, the electrical resistance heater elements within the heater tanks 88 and 96 so that the mixture is heated as desired as it is pumped through the tanks and out through the wand 106. If additional flow or pressure is desired, then push button switch 136 must also be actuated to energize the second pump 44. The combination of a two pump system will provide 100 psi saturated steam at 325 degrees F. with a 150 degree F. temperature rise. Actuation of the second pump 44 will double the flow capacity and halve the temperature rise thus producing 200 degree F. water at 500 psi. The higher pressure results from greater flow through the same size discharge orifice in the wand 106. The cleaning system 10 is designed so that full performance and steam will develop in about 3 minutes, so that with continuity of flow through the inlet flow control 28, the system will be fully purged of air and primed within the start-up time.

From the foregoing, it will be apparent that the present invention comprises an improved pressure cleaning system having numerous advantages over the prior art. The system incorporates features to facilitate complete purging of air from the system and thus priming of the system in minimal time, together with flow control features for sensing irregularities in the supply of water and/or undue temperature rises in the heater tanks to avoid overheating and thus damage and premature burnout. The system utilizes only mechanical and electrical components, all of which are at least partially enclosed in a surrounding frame for safety. The controls are housed in a separate control box. The heater tanks are surrounded by insulating jackets so that the exteriors thereof remain at substantially ambient temperature. Other advantages will be evident to those skilled in the art.

Although particular embodiments of the invention have been illustrated in the accompanying Drawings and described in the foregoing Detailed Description, it will be understood that the invention is not limited to the embodiment disclosed but it is intended to embrace any alternatives, equivalents, modifications and/or rearrangements of elements following within the scope of the invention as defined by the following claims.

I claim:

1. A substantially explosion-proof pressure cleaning system suitable for use under hazardous conditions which comprises:

a frame;

means for supporting said frame for movement;

a supply tank mounted at one end of said frame, said tank having an inlet and an outlet;

a float valve connected to the inlet of said tank;

a flow sensor connected to the inlet of said tank;

a pump mounted on said frame at a level substantially even with the outlet of said tank, said pump having an inlet and an outlet;

an electric motor drivingly connected with said pump;

a removable shroud enclosing said pump and said motor;

a U-shaped conduit interconnecting the outlet of said tank and inlet of said pump;

an elongate, closed electrical heater tank mounted in substantially horizontal orientation on said frame at a level below said pump, said heater tank including an inlet and an outlet positioned in spaced-apart relationship at opposite ends on the upper side of said tank;

means for interconnecting the inlet of said heater tank and the outlet of said pump;

a control box mounted on the other end of said frame;

a temperature sensor associated with the outlet of said heater tank; and control means within said box responsive to said flow sensor and said temperature sensor for controlling operation of said pump and heater tank so that sufficient priming is maintained to avoid overheating and premature burnout of said heater tank.

2. The pressure cleaning system of claim 1, wherein said heater tank is of the type comprising a vessel with an electrical resistance heating element extending therein, and further including:

an insulating jacket surrounding said heater tank.

3. The pressure cleaning system of claim 1, wherein said control means includes:

a first switch for controlling operation of said electric motor; and a second switch for controlling operation of said electrical heater tank.

4. A pressure cleaning system, which comprises:

a frame;

wheels for supporting said frame for movement;

a supply tank mounted on said frame, said tank having an inlet and an outlet;

a float valve connected to the inlet of said tank;

a flow sensor connected to the inlet of said tank;

a pump mounted on said frame at a level substantially even with the outlet of said tank, said pump having an inlet and an outlet;

an electric motor drivingly connected to said pump;

a removable shroud enclosing pump and said motor;

a U-shaped conduit interconnecting the outlet of said tank and inlet of said pump;

an elongate, closed electric heater tank mounted on said frame below said pump, said heater tank including an inlet and an outlet positioned in spaced-apart relationship at opposite ends on the upper side of said tank;

an insulating jacket surrounding said electric heater tank;

means for interconnecting the inlet of said heater tank and the outlet of said pump;

a temperature sensor associated with said heater tank;

means defining a discharge outlet connected to the outlet of said heater tank;

a spray wand adapted for connection to said discharge outlet means;

a closed box with an openable front panel mounted on the other end of said frame opposite said supply tank; and control means within said box and including sealed switches on the panel responsive to said flow and temperature sensors for controlling operation of said pump and heater tank in accordance with predetermined flow and temperature conditions in the system so that sufficient priming is maintained to avoid overheating and premature burnout of said heater tank.

* * * * *